(12) United States Patent
Yan et al.

(10) Patent No.: US 12,128,897 B2
(45) Date of Patent: Oct. 29, 2024

(54) MEASURING DRIVING STYLES AND CALIBRATING DRIVING MODELS

(71) Applicant: INTERNATIONAL BUSINESS MACHINES CORPORATION, Armonk, NY (US)

(72) Inventors: Zhanhong Yan, Setagaya-ku (JP); Satoshi Masuda, Nerima-ku (JP); Michiaki Tatsubori, Oiso (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 383 days.

(21) Appl. No.: 17/476,107

(22) Filed: Sep. 15, 2021

(65) Prior Publication Data
US 2023/0081726 A1    Mar. 16, 2023

(51) Int. Cl.
*B60W 30/16* (2020.01)
*B60W 40/09* (2012.01)
*B60W 50/00* (2006.01)
*G06N 3/045* (2023.01)
*G06N 7/01* (2023.01)

(52) U.S. Cl.
CPC ............ *B60W 30/16* (2013.01); *B60W 40/09* (2013.01); *B60W 50/00* (2013.01); *G06N 3/045* (2023.01); *B60W 2050/0029* (2013.01); *B60W 2050/0083* (2013.01)

(58) Field of Classification Search
None
See application file for complete search history.

(56) References Cited

U.S. PATENT DOCUMENTS

2018/0113458 A1    4/2018  Dong et al.
2018/0120843 A1*   5/2018  Berntorp ................. G06N 3/08

FOREIGN PATENT DOCUMENTS

CN    108275156 A    7/2018

OTHER PUBLICATIONS

Sobhan Moosavi, Driving Style Representation in Convolutional Recurrent Neural Network Model of Driver Identification, Feb. 11, 2021 (Year: 2021).*

(Continued)

*Primary Examiner* — Jaime Figueroa
*Assistant Examiner* — Atticus A Cameron
(74) *Attorney, Agent, or Firm* — Tutunjian & Bitetto, P.C.; Robert Richard Aragona

(57) ABSTRACT

A method is provided for driving model calibration. The method clusters a plurality of vehicle trajectories into a plurality of datasets for different driving styles based on a score. The score is calculated for each vehicle trajectory by an objective entropy weight method. The method trains, for each of the plurality of datasets for the different driving styles relative to an existing target driving model, a respective neural network which inputs a respective one of the plurality of datasets and outputs a respective parameter for the existing target driver model to obtain a plurality of trained neural networks. The existing target driver model is for simulating human driving behaviors. The method performs, for each trained neural network, an online adaptation of the existing target driving model based on a respective output of each of the plurality of trained neural networks to obtain a plurality of adapted driver models.

20 Claims, 11 Drawing Sheets

(56) References Cited

OTHER PUBLICATIONS

Zhiyu Huang, Driving Behavior Modeling using Naturalistic Human Driving Data with Inverse Reinforcement Learning, Jul. 20, 2021 (Year: 2021).*

Huang, 'Driving Behavior Modeling Using Naturalistic Human Driving Data with Inverse Reinforcement Learning' IEEE (Year: 2021).*

Moosavi, 'Driving Style Representation in Convolutional Recurrent Neural Network Model of Driver Identification' (Year: 2021).*

Mell et al., "The NIST Definition of Cloud Computing", National Institute of Standards and Technology, Special Publication 800-145. Sep. 2011, pp. 1-7.

Taubman-Ben-Ari, Orit, et al. "The multidimensional driving style inventory—scale construct and validation", Accident Analysis & Prevention. May 1, 2004, pp. 323-332.

Mudgal, Abhisek, et al. "Driving behavior at a roundabout: A hierarchical Bayesian regression analysis", Transportation research part D: transport and environment. Jan. 1, 2014, pp. 20-26.

Murphey, Yi Lu, et al. "Driver's style classification using jerk analysis", In2009 IEEE Workshop on Computational Intelligence in Vehicles and Vehicular Systems. Mar. 30, 2009, pp. 1-6.

Xu, Li, et al. "Establishing style-oriented driver models by imitating human driving behaviors", IEEE Transactions on Intelligent Transportation Systems, vol. 16, No. 5. Oct. 2015, pp. 2522-2530.

Augustynowicz, A. "Preliminary classification of driving style with objective rank method", International journal of automotive technology, vol. 10, No. 5. Oct. 10, 2009, pp. 607-610.

Dorr, Dominik, et al. "Online driving style recognition using fuzzy logic", In17th international IEEE conference on Intelligent transportation systems (ITSC). Oct. 8, 2014, pp. 1021-1026.

Anastasia Bolovinou, Angelos Amditis, et al. "Driving style recognition for co-operative driving: A survey", InThe Sixth International Conference on Adaptive and Self-Adaptive Systems and Applications. May 2014, pp. 73-78.

Van Ly, Minh, et al. "Driver classification and driving style recognition using inertial sensors", In2013 IEEE Intelligent Vehicles Symposium (IV). Jun. 23, 2013, pp. 1040-1045.

Song, Jie, et al. "Research on car-following model based on SUMO", InThe 7th IEEE/International Conference on Advanced Infocomm Technology. Nov. 14, 2014, pp. 47-55.

Xiao, Lin, et al. "Realistic car-following models for microscopic simulation of adaptive and cooperative adaptive cruise control vehicles", Transportation Research Record, No. 2623. Jan. 1, 2017, pp. 1-9.

Ahmed, Hafiz Usman, et al. "A Review of Car-Following Models and Modeling Tools for Human and Autonomous-Ready Driving Behaviors in Micro-Simulation", Smart Cities. Mar. 2021, pp. 314-335.

Zhu, Meixin, et al. "Modeling car-following behavior on urban expressways in Shanghai: A naturalistic driving study", Transportation research part C: emerging technologies. Aug. 1, 2018, pp. 1-34.

Zhi, Hua, et al. "A novel risk assessment model on software system combining modified fuzzy entropy-weight and AHP", In2017 8th IEEE International Conference on Software Engineering and Service Science (ICSESS). Nov. 24, 2017, pp. 451-454.

Brochu, Eric, et al. "A tutorial on Bayesian optimization of expensive cost functions, with application to active user modeling and hierarchical reinforcement learning", arXiv preprint arXiv:1012.2599. Dec. 12, 2010, pp. 1-49.

Fan, Jing, et al. "Analysis of taxi driving behavior and driving risk based on trajectory data", In2019 IEEE Intelligent Vehicles Symposium (IV). Jun. 9, 2019, pp. 220-225.

Gauthier, Laurent, et al. "Calibration of driving behavior models using derivative-free optimization and video data for Montreal highways", The Natural Academics of Sciences, Engineering, Medicine, TRID The TRIS and ITRD Database, Transportation Research Board 95th Annual Meeting. Jan. 1, 2016, pp. 1-15.

Markou, Ioulia, et al. "Dynamic car-following model calibration using SPSA and ISRES algorithms", Periodica Polytechnica Transportation Engineering. May 29, 2017, pp. 146-156.

Salvucci, Dario D., et al. "Modeling driver behavior in a cognitive architecture", Human factors, vol. 48, No. 2. Jun. 2006, pp. 362-380.

Ikami, Norimitsu, et al. "Online parameter estimation of driving behavior using probability-weighted arx models", In2011 14th International IEEE Conference on Intelligent Transportation Systems (ITSC). Oct. 5, 2011, pp. 1874-1879.

Xue, Qingwen, et al. "Rapid driving style recognition in car-following using machine learning and vehicle trajectory data", Journal of advanced transportation. Jan. 23, 2019, pp. 1-12.

Yan, Zhanhong, et al. "A Method for Measuring Driving styles and Calibrating Corresponding Driving model", Association for the Advancement of Artificial Intelligence. Jan. 2021, pp. 1-4.

Han, Wei, et al. "A statistical-based approach for driving style recognition using Bayesian probability with kernel density estimation", Institution of Engineering and Technology 2015, IET Research Journals. Jan. 2015, pp. 1-8.

* cited by examiner

MEASURING DRIVING STYLES AND CALIBRATING DRIVING MODELS

BACKGROUND

The present invention generally relates to vehicle, and more particularly to measuring driving styles and calibrating driving models.

Testing self-driving cars in different areas require surrounding cars with different driving styles accordingly. A method to measure and differentiate the driving style numerically to create a virtual driver with a certain driving style accordingly is in demand. However, most methods measuring driving style need thresholds or labels to classify, and some of them require additional experiments. These limitations do not fit for creating a large virtual testing environment. Meanwhile, Driving Models (DMs) simulate human driving behaviors. Calibrating the DM makes the simulated driving behavior getting closer to the real behaviors and therefore creates a natural-behavior car in simulation. The main DM calibrating methods do not consider that the parameters in a DM are variable while driving. These "fixed" calibrating methods can not reflect an interactive and real driving scenario. Hence, a dynamic method is required for naturally simulating a driver's behavior.

SUMMARY

According to aspects of the present invention, a computer-implemented method is provided for driving model calibration. The method includes clustering a plurality of vehicle trajectories into a plurality of datasets for different driving styles based on a score. The score is calculated for each of the plurality of vehicle trajectories by an objective entropy weight method. The method further includes training, by a processor device, for each of the plurality of datasets for the different driving styles relative to an existing target driving model, a respective neural network which inputs a respective one of the plurality of datasets and outputs a respective parameter for the existing target driver model to obtain a plurality of trained neural networks. The existing target driver model is for simulating human driving behaviors. The method also includes performing, for each of the plurality of trained neural networks, an online adaptation of the existing target driving model based on a respective output of each of the plurality of trained neural networks to obtain a plurality of adapted driver models.

According to other aspects of the present invention, a computer program product is provided for driving model calibration. The computer program product includes a non-transitory computer readable storage medium having program instructions embodied therewith. The program instructions are executable by a computer to cause the computer to perform a method. The method includes clustering, by a processor device, a plurality of vehicle trajectories into a plurality of datasets for different driving styles based on a score. The score is calculated for each of the plurality of vehicle trajectories by an objective entropy weight method. The method also includes training, by the processor device for each of the plurality of datasets for the different driving styles relative to an existing target driving model, a respective neural network which inputs a respective one of the plurality of datasets and outputs a respective parameter for the existing target driver model to obtain a plurality of trained neural networks. The existing target driver model is for simulating human driving behaviors. The method additionally includes performing, by the processor device for each of the plurality of trained neural networks, an online adaptation of the existing target driving model based on a respective output of each of the plurality of trained neural networks to obtain a plurality of adapted driver models.

According to yet other aspects of the present invention, a computer processing system is provided for driving model calibration. The computer processing system includes a memory device for storing program code. The computer processing system further includes a processor device operatively coupled to the memory device for running the program code to cluster a plurality of vehicle trajectories into a plurality of datasets for different driving styles based on a score. The score is calculated for each of the plurality of vehicle trajectories by an objective entropy weight method. The processor device further runs the program code to train, for each of the plurality of datasets for the different driving styles relative to an existing target driving model, a respective neural network which inputs a respective one of the plurality of datasets and outputs a respective parameter for the existing target driver model to obtain a plurality of trained neural networks. The existing target driver model is for simulating human driving behaviors. The processor device also runs the program code to perform, for each of the plurality of trained neural networks, an online adaptation of the existing target driving model based on a respective output of each of the plurality of trained neural networks to obtain a plurality of adapted driver models.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to measuring driving styles and calibrating driving models.

Embodiments of the present invention divide driving data (velocity, acceleration, position, etc.) according to driving styles and calibrate the driving styles for existing driving models. For example, in one or more embodiments, the present invention divides a data-set based on a driving style score, in which an entropy weight method is utilized. With the data-sets divided, embodiments of the present invention can establish a recurrent neural network for online adaptation of parameters of a driving model (e.g., parameters $t_r$ (=driver's overall reaction time) and $t_i$ (=driver's decreasing reaction time) of a car following model, e.g., a Krauss model) for each driving style.

Embodiments of the present invention provide benefits over existing approaches including the online adaptation of the driving model parameters being closer to the real trajectory.

Figure 1:
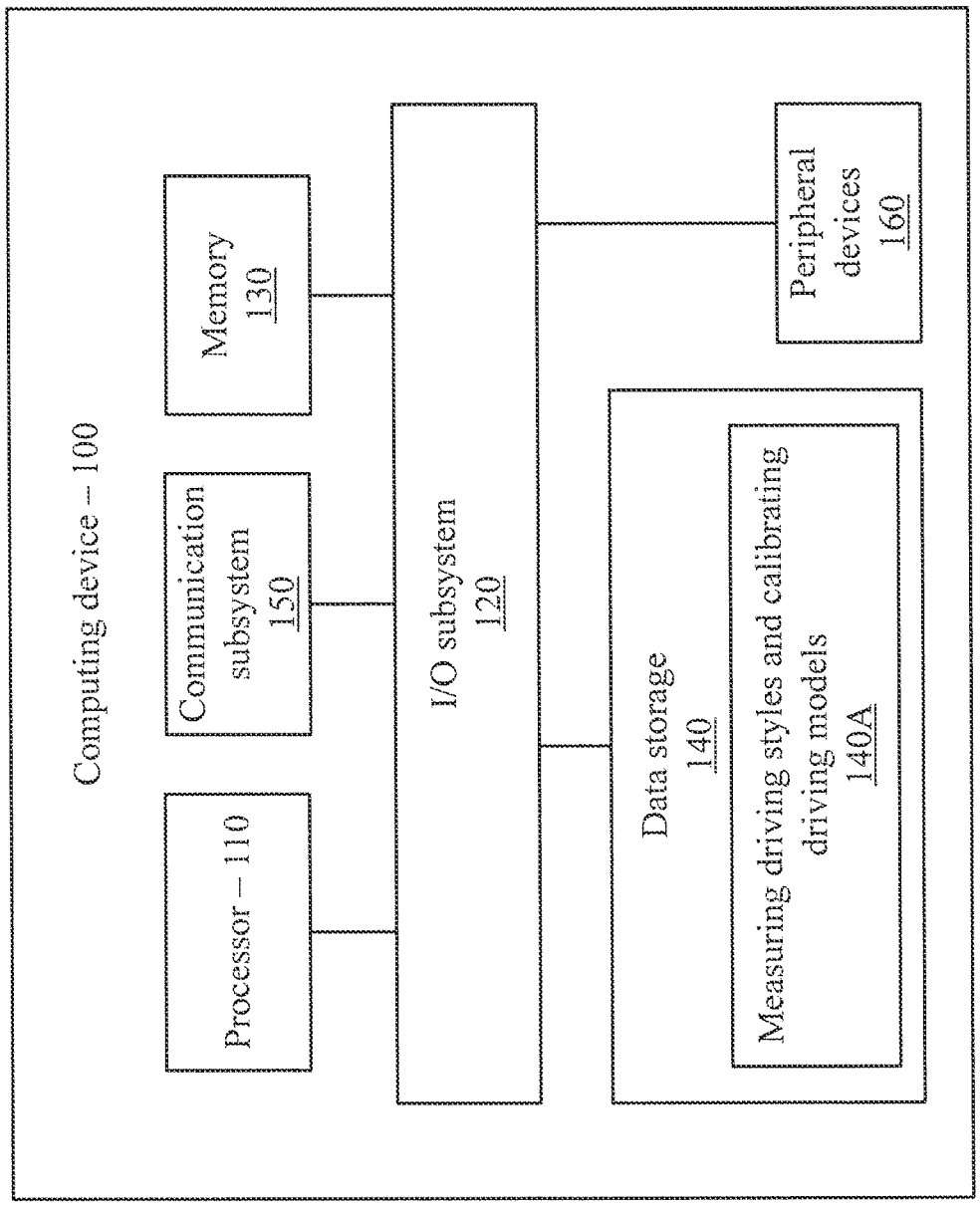
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to measure driving styles and calibrate driving models. The computer device 100 can be configured to control a vehicle responsive to data (current vehicle state) provided to the models.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for measuring driving styles and calibrating driving models. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 10-11). These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
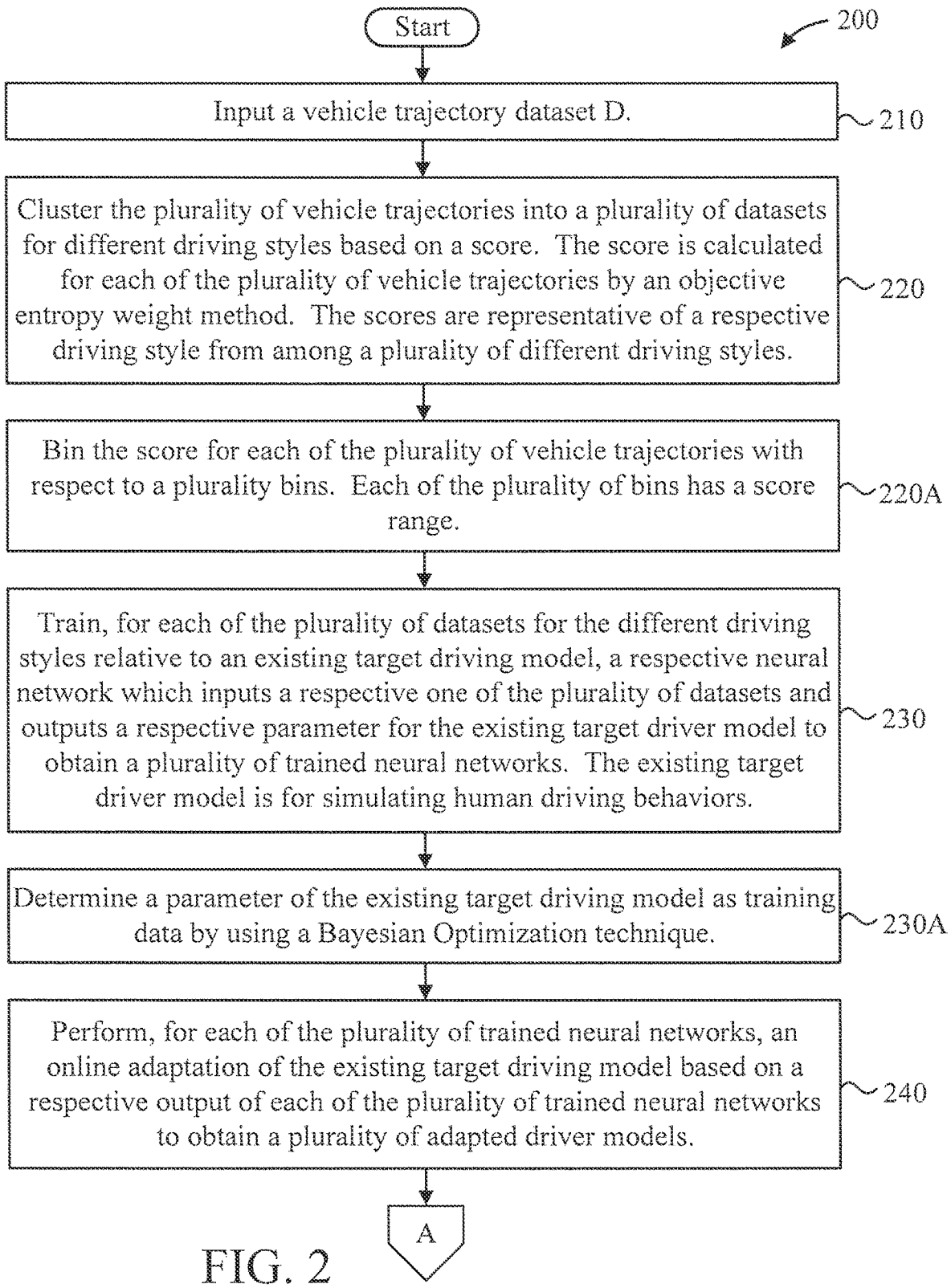
FIGS. 2-3 are flow diagrams showing an exemplary method, in accordance with an embodiment of the present invention.
Figure 3:
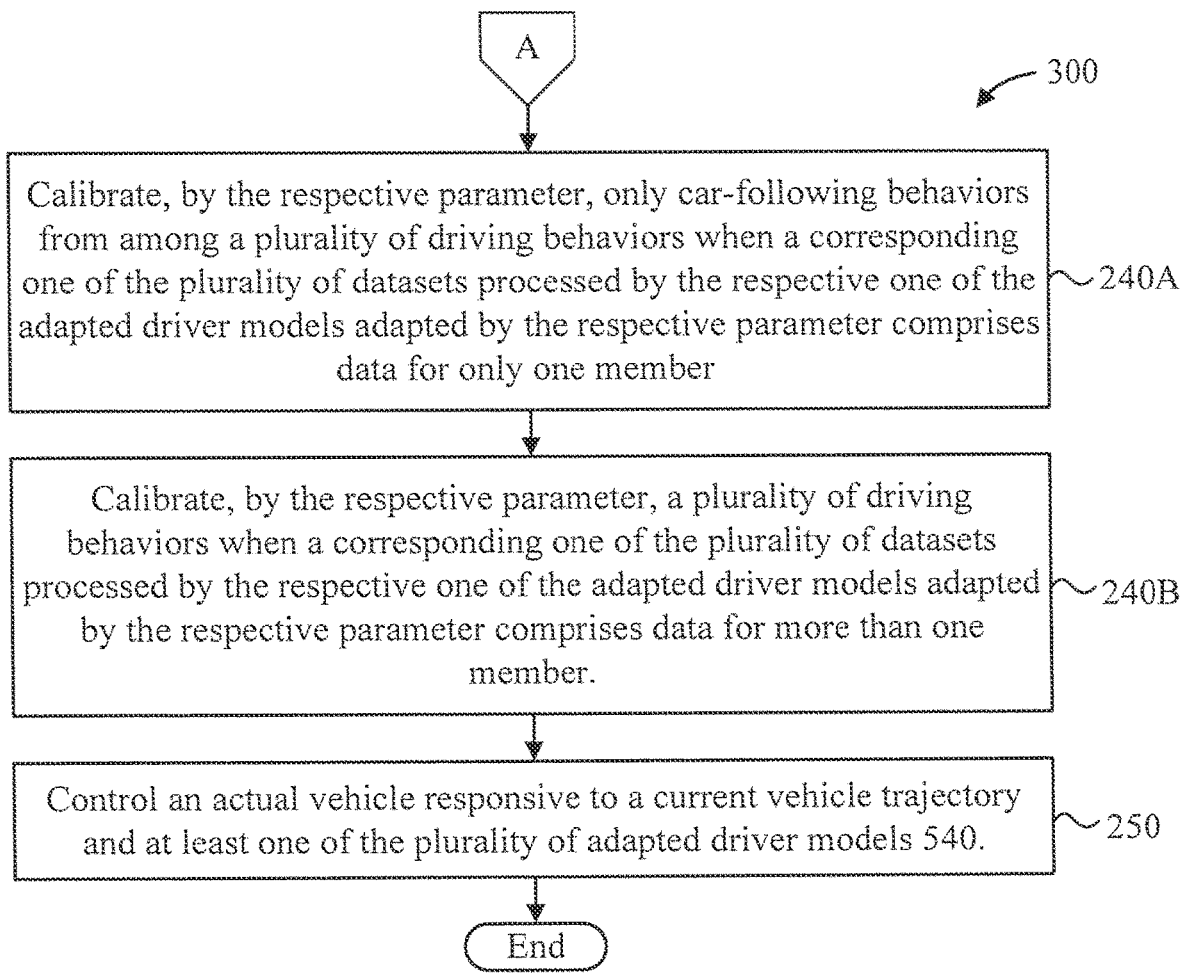
Figure 4:
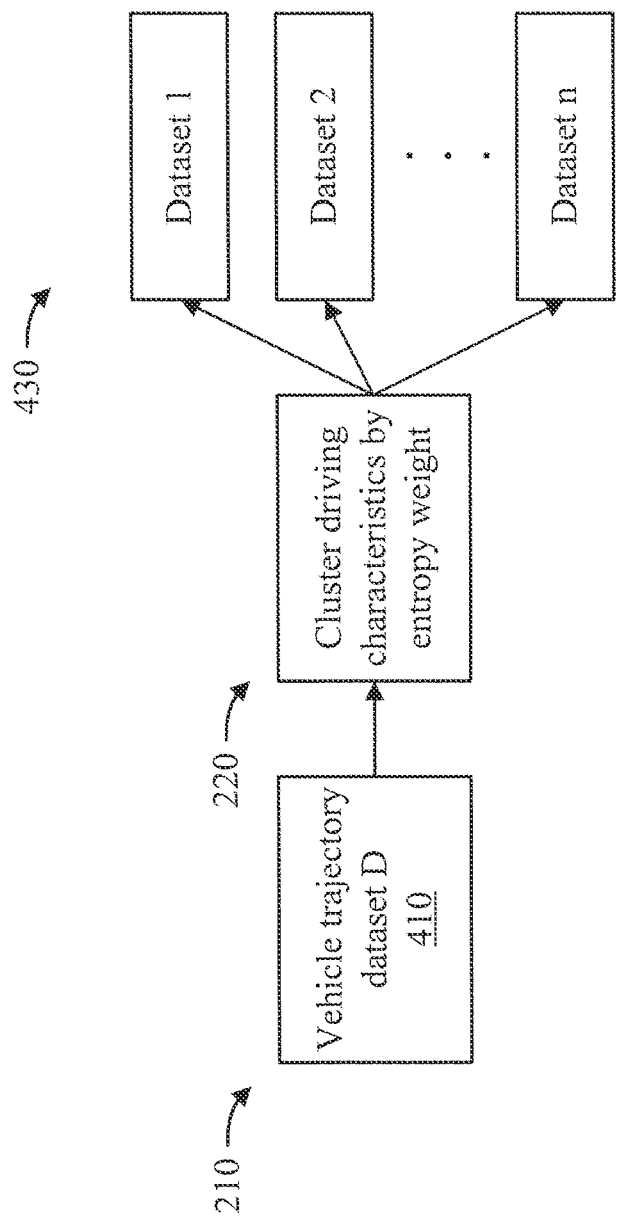
FIG. 4 is a block diagram graphically showing blocks 210 and 220 of the method of FIG. 2, in accordance with an embodiment of the present invention.
Figure 5:
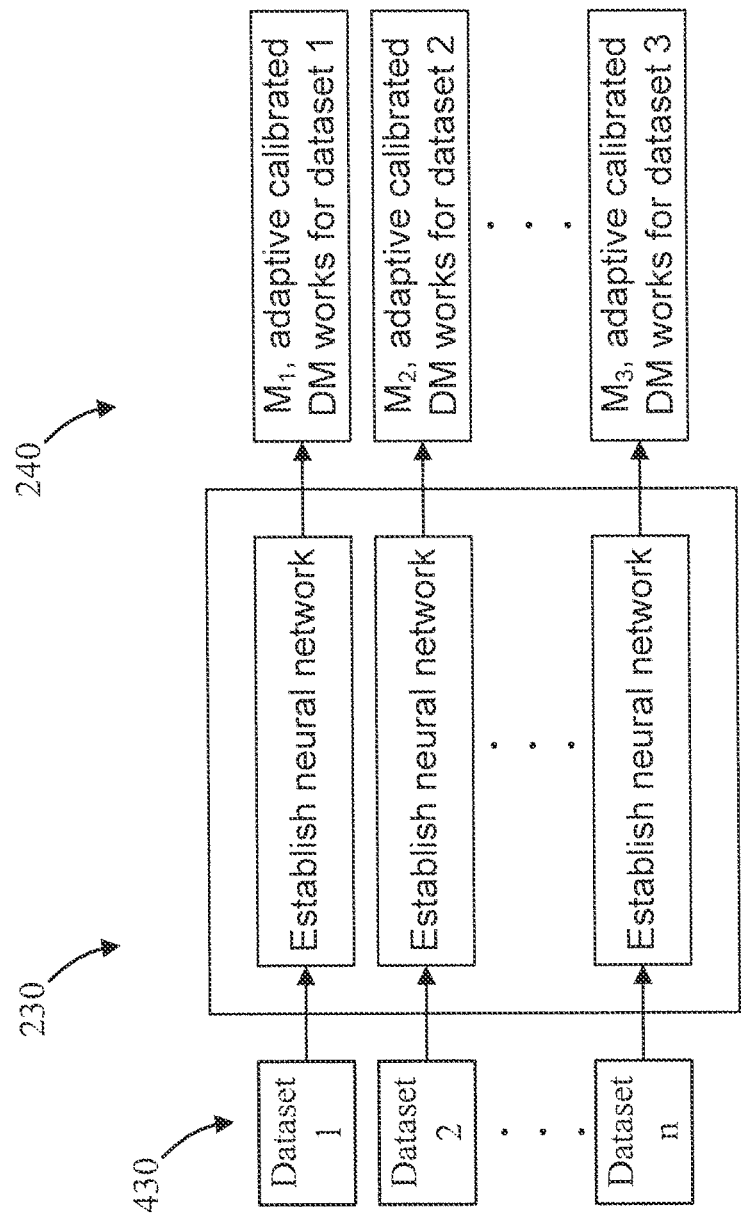
FIG. 5 is a block diagram graphically showing blocks 230 and 240 of the method of FIG. 2, in accordance with an embodiment of the present invention.

These and other variations of a hardware processor subsystem are also contemplated in accordance with embodiments of the present invention FIGS. 2-3 are flow diagrams showing an exemplary method 200, in accordance with an embodiment of the present invention. FIG. 4 is a block diagram graphically showing blocks 210 and 220 of method 200 of FIG. 2, in accordance with an embodiment of the present invention. FIG. 5 is a block diagram graphically showing blocks 230 and 240 of method 200 of FIG. 2, in accordance with an embodiment of the present invention.

At block 210, input a vehicle trajectory dataset D 410. The vehicle trajectory dataset D 410 includes a plurality of vehicle trajectories having values for features such as, for example, velocity, velocity of the preceding vehicle, acceleration, deacceleration, gap distance from preceding vehicle, vehicle position (angle, inside/outside lane, etc.), and so forth. The number of features used depends upon the implementation.

At block 220, cluster the plurality of vehicle trajectories into a plurality of datasets 430 for different driving styles based on a score. The score is calculated for each of the plurality of vehicle trajectories by an objective entropy weight method. The scores are representative of a respective driving style from among a plurality of different driving styles.

In an embodiment, block 220 can include block 220A.

At block 220A, bin the score for each of the plurality of vehicle trajectories with respect to a plurality bins. Each of the plurality of bins has a score range.

At block 230, train, for each of the plurality of datasets 430 for the different driving styles relative to an existing target driving model, a respective neural network 510 which inputs a respective one of the plurality of datasets 430 and outputs a respective parameter for the existing target driver model 530 to obtain a plurality of trained neural networks 520. The existing target driver model 530 is for simulating human driving behaviors.

In an embodiment, block 230 can include block 230A.

At block 230A, determine a parameter of the existing target driving model 530 as training data by using a Bayesian Optimization technique.

At block 240, perform, for each of the plurality of trained neural networks 520, an online adaptation of the existing target driving model based on a respective output of each of the plurality of trained neural networks to obtain a plurality of adapted driver models 540.

In an embodiment block 240 can include one or more of blocks 240A and 240B.

At block 240A, calibrate, by the respective parameter, only car-following behaviors from among a plurality of driving behaviors when a corresponding one of the plurality of datasets 430 processed by the respective one of the adapted driver models 540 adapted by the respective parameter comprises data for only one member.

At block 240B, calibrate, by the respective parameter, a plurality of driving behaviors when a corresponding one of the plurality of datasets 430 processed by the respective one of the adapted driver models 540 adapted by the respective parameter comprises data for more than one member.

At block 250, control an actual vehicle responsive to a current vehicle trajectory and at least one of the plurality of adapted driver models 540.

Figure 10:
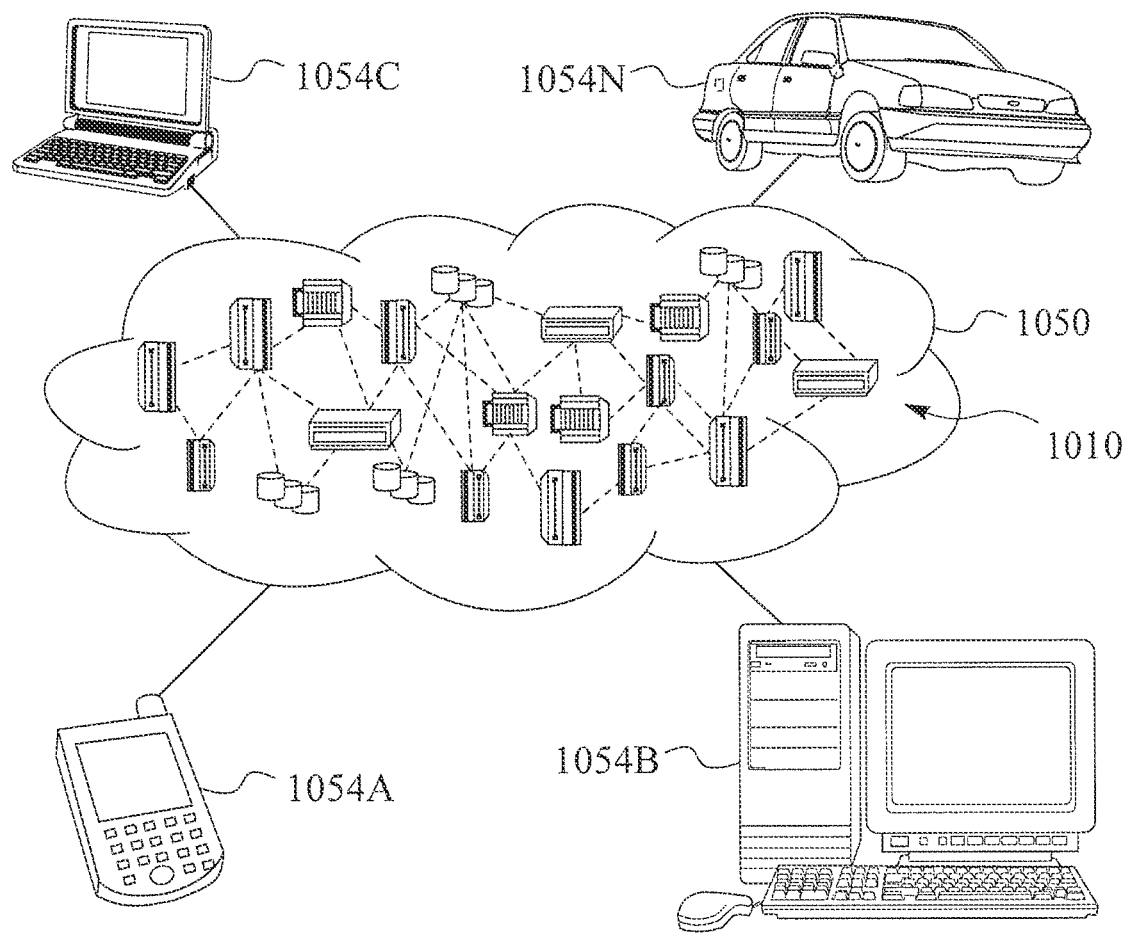
FIG. 10 is a block diagram showing an illustrative cloud computing environment having one or more cloud computing nodes with which local computing devices used by cloud consumers communicate, in accordance with an embodiment of the present invention.
Figure 11:
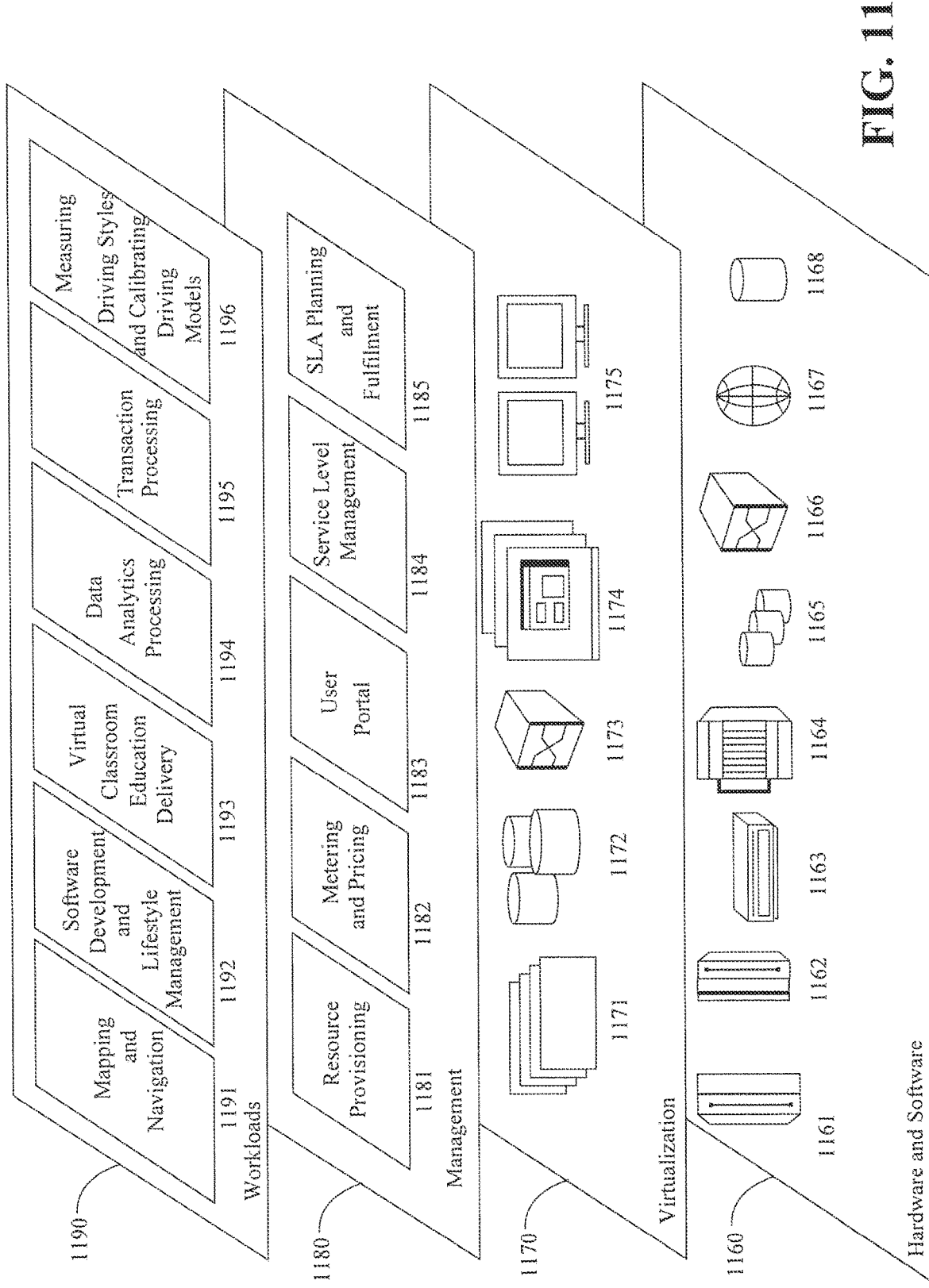
FIG. 11 is a block diagram showing a set of functional abstraction layers provided by a cloud computing environment, in accordance with an embodiment of the present invention.

It is to be appreciated that one or more of the steps of method 200 can be performed in the cloud (see, e.g., FIGS. 10-11).

Figure 6:
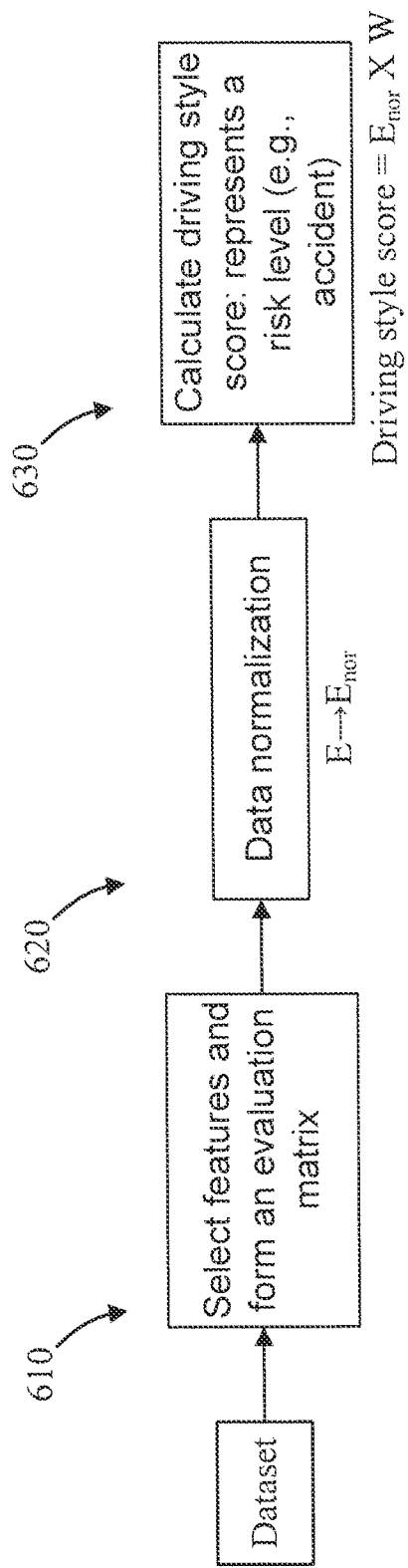
FIG. 6 is a high-level block diagram graphically showing block 220 of the method of FIG. 2, in accordance with an embodiment of the present invention.

FIG. 6 is a high-level block diagram graphically showing block 220 of method 200 of FIG. 2, in accordance with an embodiment of the present invention.

At block 610, select features from the dataset D and form an evaluation matrix E. Feature f1 can be mean velocity, feature f2 can be the forming of an evaluation matrix E.

At block 620, perform data normalization. For example, normalize evaluation matrix E such that $E \rightarrow E_{nor}$.

At block 630, calculate the driving style score. The driving style score can be calculated as follows: $E_{nor} \times W$, where W represents a entropy weight vector.

Figure 7:
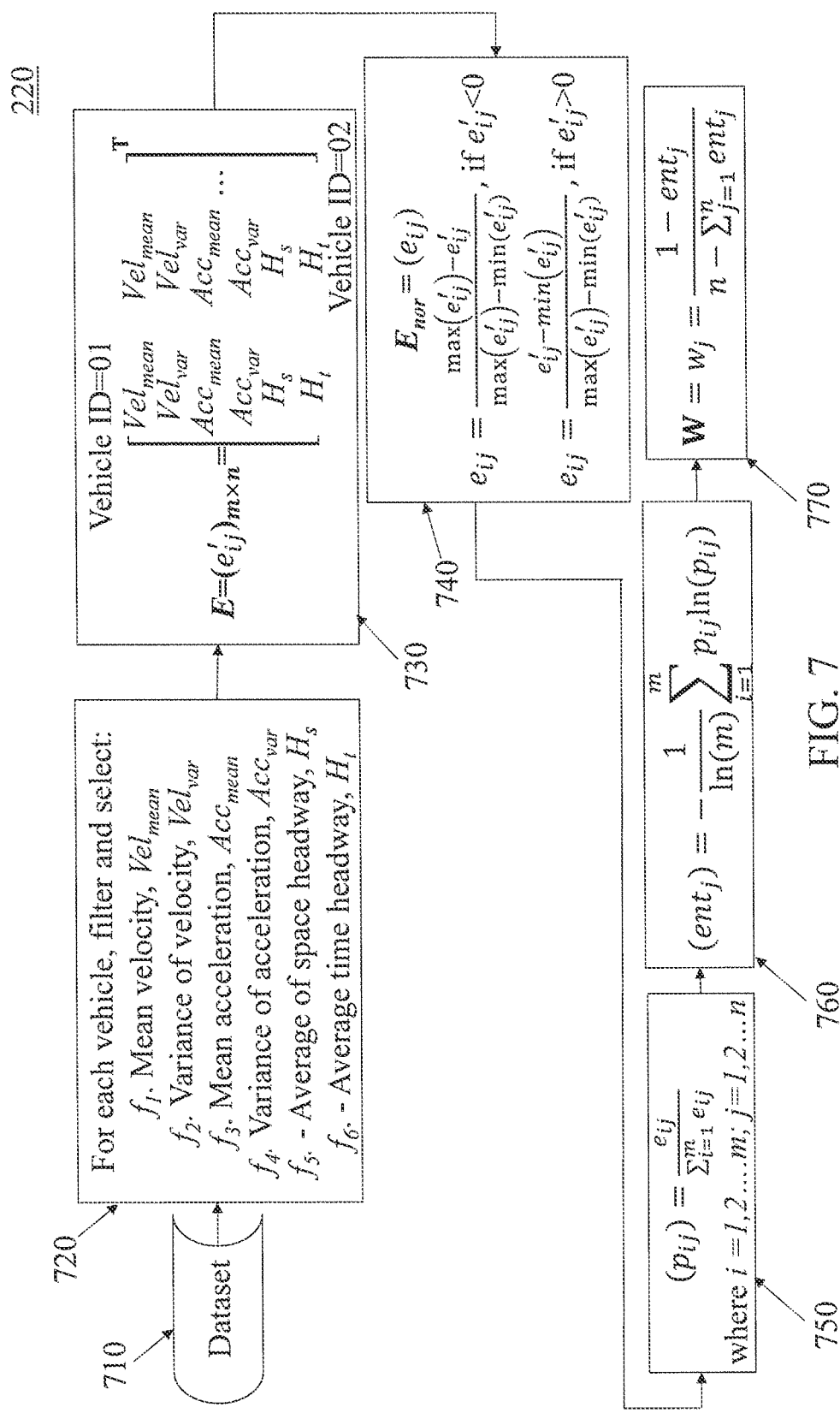
FIG. 7 is a high-level block diagram further graphically showing block 220 of the method of FIG. 2, in accordance with an embodiment of the present invention.

FIG. 7 is a high-level block diagram further graphically showing block 220 of method 200 of FIG. 2, in accordance with an embodiment of the present invention.

At block 710, receive the dataset D.

At block 720, perform a data clean and preparation method.

At block 730, construct an evaluation matrix.

At block 740, normalize the evaluation matrix into (0,1).

At block 750, calculate the percentage of the data weight.

At block 760, calculate the entropy value.

At block 770, calculate the entropy weight vector.

Figure 8:
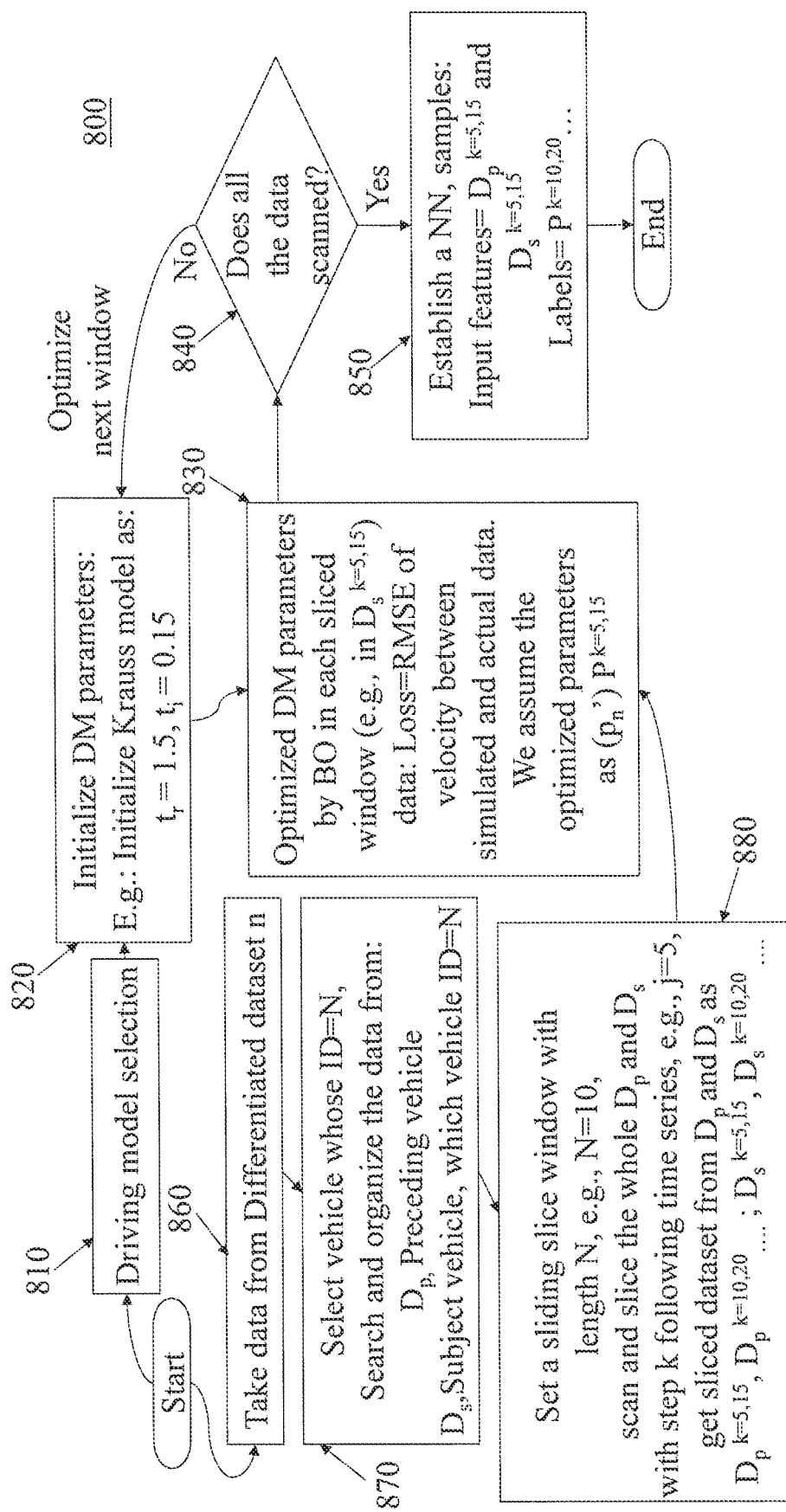
FIG. 8 is a flow diagram showing another exemplary method, in accordance with an embodiment of the present invention.

FIG. 8 is a flow diagram showing another exemplary method 800, in accordance with an embodiment of the present invention.

At block 810, perform a driving model selection (e.g., a Krauss model).

At block 820, initialize driving model parameters.

At block 830, calculate optimized parameters in Bayesian Optimization in each sliced window (e.g., in $D_s^{k=5,15}$) data as follows: loss=RMSW of velocity between simulated and actual data. Assume the optimized parameters as $(p_n)$ $P^{k=5, 15}$.

At block 840, determine whether or not all the data is scanned. If so, then proceed to block 850. Otherwise, return to block 820.

At block 850, establish a neural network (NN) with the following samples: input features=$D_p^{k=5,15}$ and $D_s^{k=5,15}$, labels=$P^{k=10,20}$.

At block 860, take data from differentiated dataset n.

At block 870, select a vehicle whose ID=N, search and organize the data from the following: $D_p$, preceding vehicle; $D_s$, subject vehicle, which vehicle ID=N.

At block 880, set a sliding window with length N, e.g., N=10, scan and slice the whole $D_p$ and $D_s$ with step k following time series, e.g., j=5, get sliced dataset from $D_p$ and $D_s$ as $D_p^{k=5,15}$, $D_p^{k=10,20}$ ... ; $D_s^{k=5,15}$, $D_s^{k=10,20}$ where, e.g., $D_p^{k=5,15}$ means the data from $D_P$, where time frame k from 5 to 15.

Figure 9:
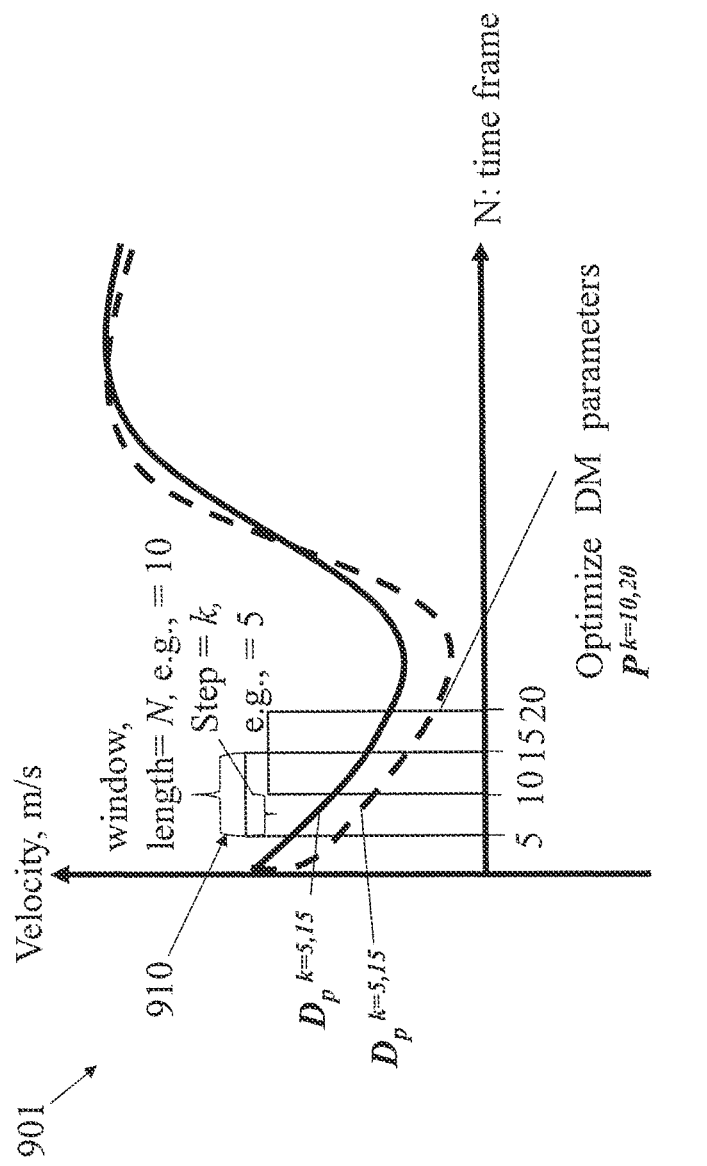
FIG. 9 is a diagram showing an exemplary plot of time frame versus velocity for a sliding slice window, in accordance with an embodiment of the present invention.

FIG. 9 is a diagram showing an exemplary plot 901 of time frame versus velocity for a sliding slice window 910, in accordance with an embodiment of the present invention.

The sample examples include the following:
Input: $[D_p^{k=5,15}\ D_s^{k=5,15}]$
Label: $[p^{k=10,20}]$
Input: $[D_p^{k=10,20}\ D_s^{k=10,20}]$
Label: $[P^{k=15,25}]$ The dashed line corresponding to preceding vehicle data, and the solid line corresponds to subject vehicle data.

Optimize the driving model parameters to minimize the difference (for the subject vehicle) by Bayesian Optimization between the simulated and real trajectory in window $P^{k=5,15}$ 910. Optimize DM parameters $P^{k=10,\ 20}$.

The steps of optimizing the DM parameters are as follows:
(1) Search parameters (Y) for short time window by BO from velocity (X) of leading and following vehicle in advance of NN training.
(2) training a NN using X and Y.

A further description will now be given regarding the DM adaptive calibrating method, in accordance with an embodiment of the present invention.

With the measurement method, we have the driving styles distribution in one dataset. However, to create an exact virtual testing environment, a method is needed to reproduce a driver's behaviors. Generally, in simulation, a driver's behavior is controlled by a DM. For example, for car-following behavior, by setting the inner parameters in a DM, the driver can tend to have shorter gap distance, or faster average speed. A typical DM is a modified Krauss model for car-following behavior as follows:

$$v_{des} = \min[v_{max}, v + at_{step}, v_{safe}]$$

$$v_{safe} = -b\left(t_r + \frac{t_i}{2}\right) + \sqrt{b^2\left(t_r + \frac{1}{2}t_i\right)^2 + b\left(v_l t_i + \frac{v_l^2}{a} + 2\ g\right)}$$

$v_{des}$ is the desired speed in simulation environment, $t_r$=Driver's overall reaction time, and $t_i$=Driver's decreasing reaction time. $t_r$, $t_i$ are the inner parameters define driving behavior (speed control). For reproducing a driver's car-following behavior, calibrating $t_r$, $t_i$ can make $v_{des}$ closer to the real collected data. Therefore, a well-calibrated DM can naturally simulate a real driver's car-following behavior. For the rest parameters, b=max deceleration, a=max acceleration, $v_l$=preceding vehicle speed. g=subject vehicle gap distance to the preceding vehicle; $t_{step}$=Simulation frame interval; $v_{max}$=limitation of max speed road.

The forward Euler method was then used to solve for the vehicle position and speed as follows:

$$V_n(t+\Delta T)=V_n(t)+a_n(t)\cdot\Delta T$$

$$X_n(t+\Delta T)=X_n(t)+V_n(t)\cdot\Delta T$$

Previous research proposed many calibration methods. However, the main limitations were that they did not consider that the inner parameters could vary when driving. Embodiments of the present invention propose a method based on Bayesian Optimization (BO) and Gated Recurrent Unit (GRU). The output should be a policy r worked by network which input vehicle current state and next possible parameters which minimize the difference between the actual and simulated trajectories.

Assuming the target is to reproduce one driver as subject vehicle by using a DM with M inner parameters set $P_M\{p_1, p_2, \ldots p_M\}$ the data used for reproduction can be one driver (assuming he/she with an ID=d, $s_i$) or from several drivers $d_1, d_2 \ldots d_n$ whose s lies in a certain range. For driver $d_i$ in the reproduction dataset, we select the data from the subject vehicle as $D_{s,i}$ and the data from the preceding $D_{p,i}$.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 10, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and multi-step ahead forecasting using complex-valued vector autoregression 1196.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for driving model calibration, comprising:
   clustering a plurality of vehicle trajectories into a plurality of datasets for different driving styles based on a score, the score being calculated for each of the plurality of vehicle trajectories by an objective entropy weight method;
   training, by a processor device, for each of the plurality of datasets for the different driving styles relative to an existing target driving model to simulate human driving behaviors, a respective neural network which inputs a respective one of the plurality of datasets and outputs a respective parameter for the existing target driving model to obtain a plurality of trained neural networks; and
   obtaining a plurality of adapted driver models adapted on at least one of a plurality of driving behaviors by performing, for each of the plurality of trained neural networks, an online adaptation of the existing target driving model based on a respective output of each of the plurality of trained neural networks to control a motor vehicle using the plurality of adapted driving models.

2. The computer-implemented method of claim 1, wherein a parameter of the existing target driving model is determined as training data by using a Bayesian Optimization technique.

3. The computer-implemented method of claim 1, wherein one of the plurality of datasets is selected from among the plurality of datasets for different driving styles based on each occurrence probability of the plurality of datasets in a target region.

4. The computer-implemented method of claim 1, further comprising controlling a motor vehicle responsive to a current vehicle state and at least one of the plurality of adapted driving models.

5. The computer-implemented method of claim 1, wherein the score for each of the plurality of vehicle trajectories is binned with respect to a plurality of bins, each of the plurality of bins having a score range.

6. The computer-implemented method of claim 1, wherein each of the neural networks corresponds to only the respective one of the plurality of datasets.

7. The computer-implemented method of claim 1, wherein the respective parameter calibrates only car-following behaviors, from among a plurality of driving behaviors, when a corresponding one of the plurality of datasets processed by the respective one of the adapted driver models adapted by the respective parameter comprises data for only one member.

8. The computer-implemented method of claim 1, wherein the respective parameter calibrates a plurality of driving behaviors when a corresponding one of the plurality of datasets processed by the respective one of the adapted driver models adapted by the respective parameter comprises data for more than one member.

9. The computer-implemented method of claim 1, wherein the objective entropy weight method comprises calculating an entropy weight vector corresponding to features in a feature evaluation matrix, the features being extracted from the plurality of datasets.

10. The computer-implemented method of claim 9, wherein the feature evaluation matrix comprises features comprising mean velocity and gap distance from preceding vehicle.

11. A computer program product for driving model calibration, the computer program product comprising a non-transitory computer readable storage medium having program instructions embodied therewith, the program instructions executable by a computer to cause the computer to perform a method comprising:
    clustering, by a processor device, a plurality of vehicle trajectories into a plurality of datasets for different driving styles based on a score, the score being calculated for each of the plurality of vehicle trajectories by an objective entropy weight method;
    training, by a processor device, for each of the plurality of datasets for the different driving styles relative to an existing target driving model to simulate human driving behaviors, a respective neural network which inputs a respective one of the plurality of datasets and outputs a respective parameter for the existing target driving model to obtain a plurality of trained neural networks; and
    obtaining a plurality of adapted driver models adapted on at least one of a plurality of driving behaviors by performing, for each of the plurality of trained neural networks, an online adaptation of the existing target driving model based on a respective output of each of the plurality of trained neural networks to control a motor vehicle using the plurality of adapted driving models.

12. The computer program product of claim 11, wherein a parameter of the existing target driving model is determined as training data by using a Bayesian Optimization technique.

13. The computer program product of claim 11, wherein one of the plurality of datasets is selected from among the plurality of datasets for different driving styles based on each occurrence probability of the plurality of datasets in a target region.

14. The computer program product of claim 11, further comprising controlling a motor vehicle responsive to a current vehicle state and at least one of the plurality of adapted driving models.

15. The computer program product of claim 11, wherein the score for each of the plurality of vehicle trajectories is binned with respect to a plurality of bins, each of the plurality of bins having a score range.

16. The computer program product of claim 11, wherein each of the neural networks corresponds to only the respective one of the plurality of datasets.

17. The computer program product of claim 11, wherein the respective parameter calibrates only car-following behaviors, from among a plurality of driving behaviors, when a corresponding one of the plurality of datasets processed by the respective one of the adapted driver models adapted by the respective parameter comprises data for only one member.

18. The computer program product of claim 11, wherein the respective parameter calibrates a plurality of driving behaviors when a corresponding one of the plurality of datasets processed by the respective one of the adapted driver models adapted by the respective parameter comprises data for more than one member.

19. The computer program product of claim 11, wherein the objective entropy weight method comprises calculating an entropy weight vector corresponding to features in a feature evaluation matrix, the features being extracted from the plurality of datasets.

20. A computer processing system for driving model calibration, comprising:
- a memory device for storing program code; and
- a processor device operatively coupled to the memory device for running the program code to:
    - cluster a plurality of vehicle trajectories into a plurality of datasets for different driving styles based on a score, the score being calculated for each of the plurality of vehicle trajectories by an objective entropy weight method;
    - train, by a processor device, for each of the plurality of datasets for the different driving styles relative to an existing target driving model to simulate human driving behaviors, a respective neural network which inputs a respective one of the plurality of datasets and outputs a respective parameter for the existing target driving model to obtain a plurality of trained neural networks; and
    - obtaining a plurality of adapted driver models adapted on at least one of a plurality of driving behaviors by performing, for each of the plurality of trained neural networks, an online adaptation of the existing target driving model based on a respective output of each of the plurality of trained neural networks to control a motor vehicle using the plurality of adapted driving models.

* * * * *